Nov. 19, 1963 W. N. CARROLL 3,111,649

CAPACITOR DIGITAL DATA STORAGE AND REGENERATION SYSTEM

Filed Feb. 24, 1958

Inventor
William N. Carroll
by Edgar H. Kent Atty.

3,111,649
Patented Nov. 19, 1963

3,111,649

CAPACITOR DIGITAL DATA STORAGE AND REGENERATION SYSTEM

William N. Carroll, Wappinger Falls, N.Y., assignor to International Business Machines Corporation, New York, N.Y., a corporation of New York Filed Feb. 24, 1958, Ser. No. 716,969
6 Claims. (Cl. 340—173)

Figures 1, 2:
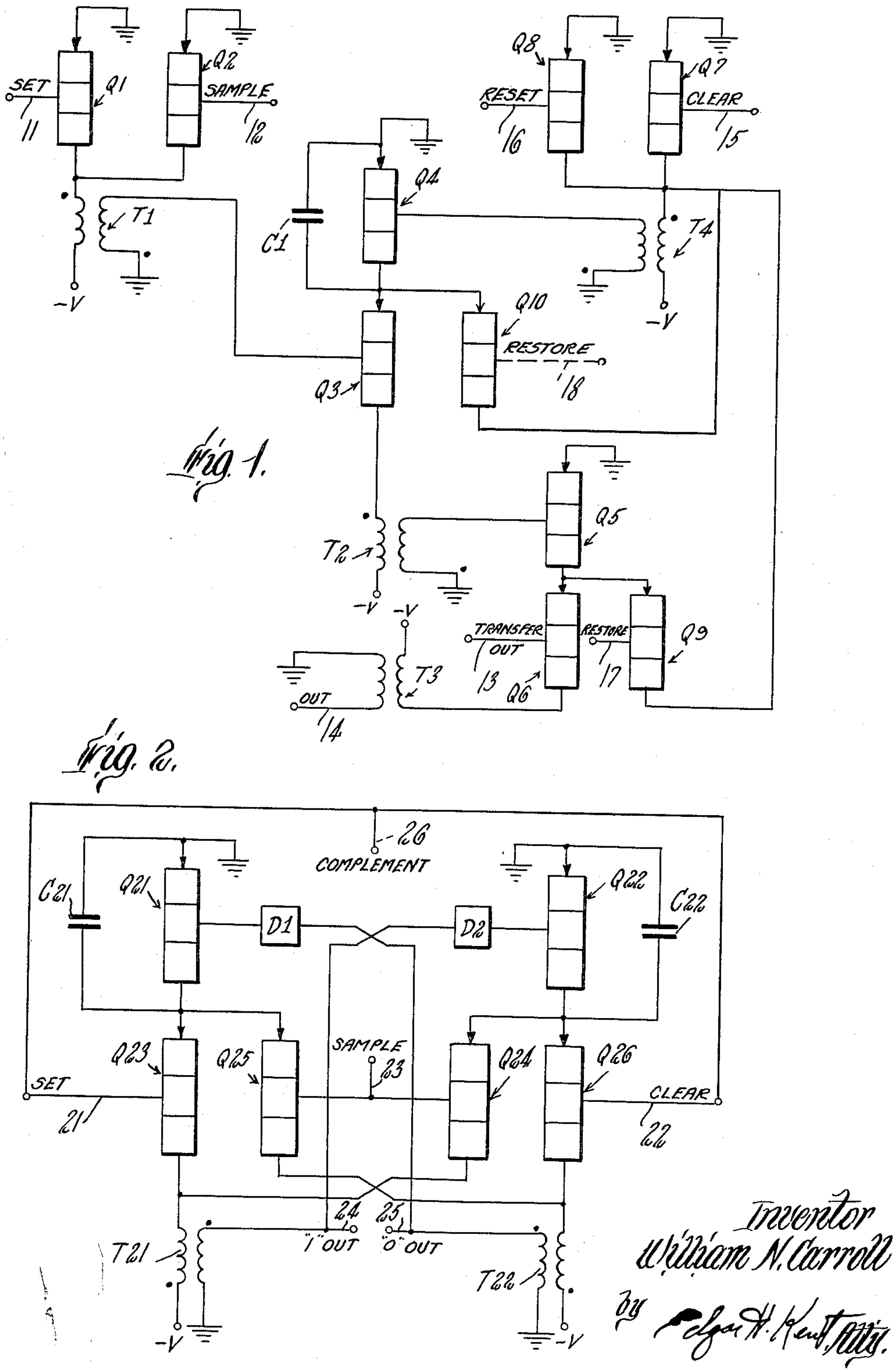

This invention relates to storage systems for digital data and in particular it is concerned with the storage of information in high speed digital computers.

As the field of application for digital computers has expanded, so has the demand grown for computers having larger and larger data handling capacities, increased speeds, and multi-purpose modes of operation. The result has been that the size of many computing machines has increased to a point where sheer bulk is a considerable problem. Then, too, it has become a problem to meet ever increasing speed requirements and to provide the necessary power to operate the machines. Although the use of magnetic cores as storage devices has gone a long way toward alleviating these problems, much of the gain realized with these devices has been offset by the added complexities involved in extending machine capabilities along such lines.

It is an object of the present invention, therefore, to provide a digital data storage system which can be operated at very high speeds, with little power, and which may be compactly arranged so as to occupy a relatively small amount of space.

Another object is to provide an improved electrostatic data storage system.

Another object is to provide a digital data storage system which is made up primarily of transistors and capacitors.

Another object is to provide a system of the above-mentioned character which is adapted to operate in response to pulse signals.

Another object is to provide for non-destructive read-out in a system of the above-mentioned character.

A further object of the invention is to provide for periodic recharge of the system so that information stored therein can be retained indefinitely.

In brief, the system according to the present invention utilizes a capacitor as a storage medium, the state of charge of the capacitor representing the sense of a binary digit. When a binary one is to be stored in the system, charging current for the capacitor is effectively turned on by means of a first transistor in response to a set pulse. Conversely, when a binary zero is to be stored, the fact is reflected in the absence of a set pulse which has the effect of leaving the capacitor discharged. To sample the system, that is to read-out the binary information stored therein, a sample pulse is applied to the transistor, and depending upon the state of charge of the capacitor, either it will become charged or remain charged. In the former case, charging current is caused to flow which produces an output pulse representing a zero. Conversely, in the latter case, virtually no charging current flows, and hence there is no output pulse, the absence of which is taken to represent a one. A second transistor is provided to discharge the capacitor in response to a clear pulse and thereby produce an effective clearing action.

With the circuitry so far described, which is disclosed in my copending application Serial No. 717,095 now Patent No. 3,041,474, filed simultaneously herewith, in the process of sampling, the capacitor will become charged when it was initially discharged, which has the effect of destroying the information stored therein. Then, too, the capacitor will become discharged after a time when it was initially charged, due to the presence of unavoidable leakage currents. By way of example, ten microseconds may be the time during which the capacitor is capable of performing the storage function.

The salient feature of the present invention is the provision of means for effectively recharging the system with the digital information that was initially placed there. This means in its preferred form utilizes a third transistor which functions to discharge the capacitor when it has become charged in the sampling process, and to maintain it in its charged state if that was its state before and during the sampling process. Thus, when the capacitor becomes charged in the process of sampling, the third transistor is adapted to produce a control pulse to cause the second transistor to perform its clearing or discharge function and thereby return the capacitor to a discharged state. In other words, the action is that of a feed back circuit where a change in state in one direction initiates a change in state in the opposite direction. If the capacitor is in an initial charged state, however, so that no change in state is produced in the sampling process, no control pulse will be produced by the third transistor. Consequently, the capacitor will remain in its charged state, which is as it should be to reflect the binary one that was stored therein.

It is particularly significant that where the capacitor is in an initially charged state there is a replenishment of the charge that has leaked off the capacitor upon the application of an input pulse, and, if the amount of charge replaced is relatively small, this is effected without generating a control pulse to cause clearing action to take place. In this way, the information stored therein may be retained indefinitely.

The novel features of the invention together with further objects and advantages thereof will become more readily apparent from the following detailed description of a preferred embodiment and the accompanying drawing to which it refers.

In the drawing:

FIG. 1 is a schematic diagram of the system according to the present invention, and FIG. 2 is a schematic diagram of a modification of the system shown in FIG. 1.

In FIG. 1 there is illustrated a system according to the present invention which includes junction transistors Q1 through Q9, each having a base electrode, an emitter electrode, and a collector electrode. Transistor Q1 has its base connected to a source of set pulses applied by way of a line 11, and its collector connected through the primary of a transformer T1 to a source of negative potential —V. The emitter of transistor Q1 is connected to a common point or ground. Transistor Q2 has its emitter and collector electrodes connected in common with those of transistor Q1, respectively, and its base electrode connected to a source of sample pulses applied by way of a line 12. Coupled to the secondary winding of the transformer T1 is the input circuit of the transistor Q3. Thus, one end of the secondary winding is connected to the base of transistor Q3 and the other end is connected to ground. To complete the circuit, transistor Q3 has its emitter connected to ground through a capacitor C1. The output of transistor Q3 is applied across the primary winding of a transformer T2 connected between the Q3 collector electrode and the source of negative potential —V.

Transistors Q7 and Q8 are arranged to respond to clear and reset pulses on lines 15 and 16, respectively, in like manner as transistors Q1 and Q2 are made responsive to set and sample pulses. To this end there is provided a transformer T4 having its primary winding connected from the collector electrodes of transistors Q7 and Q8 to the source of negative potential —V, and having its secondary winding connected between the base of transistor Q4 and ground. The output circuit of transistor Q4 comprising its emitter and collector electrodes is connected across the capacitor C1.

Transistors Q5 and Q6 are arranged to perform an AND function with output pulses from the transistor Q3 and transfer pulses applied by way of a line 13. Thus, transistor Q5 has its base connected to the secondary winding of transformer T2 with its emitter electrode grounded. The collector of transistor Q5 is connected to the emitter of transistor Q6 which has its base connected to line 13. The output from transistors Q5 and Q6 appears across the primary winding of a transformer T3 connected between the collector of transistor Q6 and —V. Transformer T3 has its secondary winding connected between ground and an output line 14 from which information pulses are derived.

Finally it will be observed that the transistor Q9 has its emitter connected to the emitter of transistor Q6 and its collector connected to the collectors of transistors Q7 and Q8. The base of transistor Q9 is connected to a source of restore pulses applied by way of a line 17 which are thereby combined in an AND function with output pulses from transistor Q5.

More particularly the operation of the system illustrated in FIG. 1 is as follows. In response to a set pulse on the line 11, transistor Q1 is caused to conduct and in turn causes transistor Q3 to do likewise. As a result, capacitor C1 becomes charged and remains so for a predetermined period depending upon its leakage characteristics and the back resistance of transistor Q4.

A sample pulse applied to the input circuit of transistor Q2 when capacitor C1 is charged has no effect on the transistor Q3 due to the negative emitter bias on transistor Q3 produced by capacitor C1. Consequently, if the transfer line 13 is pulsed at the same time, transistor Q5 will be non-conductive, thereby inhibiting an output pulse at transformer T3 and line 14. The absence of an output pulse represents the binary one entered by means of the set pulse.

To clear the one (discharge the capacitor), a pulse may be applied to either the reset line 16 or the clear line 15. Pulses on these lines have the effect of turning on transistor Q4, thereby providing a discharge path for the capacitor C1.

Where a binary zero is entered in the system as reflected by the absence of a set pulse, capacitor C1, being in the discharged state, will become charged in response to a sample pulse on line 12, thereby producing a pulse at transformer T2. If a transfer pulse is applied to terminal 13 in this case, simultaneously with the sample pulse, both transistor Q5 and Q6 will be caused to conduct so that an output pulse is caused to appear at transformer T3 to activate line 14. This is as it should be to represent a binary zero.

To return capacitor C1 to its binary zero or discharged state, a restore pulse is applied to terminal 17 coincident in time with the transfer and sample pulses. Owing to the presence of a pulse at transformer T2, the restore pulse functions to turn on transistor Q9 and produce a control pulse at transformer T4. The control pulse causes transistor Q4 to conduct, providing a discharge path for the capacitor C1. Whenever the capacitor C1 is charged as a result of the set pulse, however, and thereafter the system is sampled, the restore pulse will be ineffective to produce a control pulse at transformer T4, and thus capacitor C1 is left in its charged state. As is apparent, this is as it should be to maintain the binary one representation therein. By way of example, the system has been found to work effectively with junction transistors type Philco T1231, a negative bias voltage of ten volts, and negative one-half sine wave input pulses of one volt amplitude.

The circuitry including transistor Q10 may be used as is an alternative circuit arrangement for accomplishing the restore function. Connected to a source of restore pulses through a line 18 is the base electrode of a transistor Q10 having its emitter connected to the emitter of transistor Q3 and its collector connected to the collectors of transistors Q7 and Q8. With this arrangement, the restore function is accomplished independently of the output pulses. An advantage of this arrangement is that the restore line 18 can be pulsed as often as necessary to maintain capacitor C1 in its charged state. So long as the restore pulses on line 18, which may be characterized in this mode of operation as strobe pulses, occur at sufficiently short intervals, for example at a one hundred kilocycle rate, with a capacitor of 470 micromicrofarads the amount of charging current involved will be insufficient to produce an effective control pulse at transformer T4. Hence there will be no contemporaneous clearing action and in this way the capacitor can be caused to retain its one representation as long as desired.

The modified system of FIG. 2 is arranged to produce an output pulse representing a one on a line 24 and an output pulse representing a zero on a line 25 so that whatever is the sense of the information stored in the system, a pulse will be available on one of these lines to represent it. To this end, there are provided a pair of storage mediums in the form of capacitors C21 and C22 together with transistors Q21 through Q26, each of like character as those described in connection with FIG. 1. Transistor Q21 has its emitter and collector connected to the capacitor C21, with the emitter grounded. Transistor Q23 has its emitter connected to the collector of transistor Q21 and its collector connected to a source of negative potential —V through the primary of a transformer T21. Set pulses are applied by way of line 21 to the base electrode of transistor Q23. Also coupled to the collector of transistor Q21 is the emitter of transistor Q25 which has its collector connected to the primary winding of a transformer T22. The secondary winding of transformer T22 is coupled between ground and the zero output line 25, while the secondary winding of transformer T21 is coupled between ground and the one output line 24.

As is apparent, transistors Q22, Q24, and Q26 are connected in circuit with capacitor C22 and transformer T22 in like manner as transistors Q21, Q23, and Q25 are connected to capacitor C21 and transformer T21. Suffice it to say, therefore, that the line which controls transistor Q26, and which corresponds to line 21 from the standpoint of the circuit symmetry, has been designated by the numeral 22 and serves to apply clear pulses to the base of transistor Q26. To interrelate the functions of the capacitors C21 and C22 there is connected between the one output line 24 and the base of transistor Q22 a delay unit D2, and there is connected between the zero output line 25 and the base of transistor Q21 a delay unit D1. Also a sample line 23 is connected in common to the base electrodes of transistors Q24 and Q25.

In operation let it be assumed first that capacitor C21 has been placed in a charged state with capacitor C22 discharged, the circuit thus storing a one. Under these conditions, when a sample pulse is applied by way of the line 23, transistor Q25 will be prevented from conducting due to its emitter electrode being held negative by the capacitor C21, so that only the transistor Q24 is effectively turned on. As a result, an output pulse is caused to appear only at transformer T21, thereby to activate the one output line 24. When this line is pulsed, the pulse is applied to transistor Q22 by way of the delay D2. This causes the transistor Q22 to conduct, discharging the capacitor C22 which had become charged in the sampling process. This then restores the system to its original state.

If now it be assumed that the states of charge of capacitors C21 and C22 were initially reversed, that is, capacitor C22 was charged and C21 discharged, to represent a zero, it is apparent that transistor Q25 will be caused to conduct in response to a sampling pulse whereas transistor Q24 will be biased in the high resistance direction.

This causes a pulse to be produced across the transformer T22 and applied to the line 25 thereby to represent a zero output. As a result, capacitor C21, which had become charged when transistor Q25 was made conductive, is discharged by the clearing action of transistor Q21.

As in the case of the system of FIG. 1, when one of the capacitors is charged it can be caused to remain so without changing the state of the system. This can be accomplished by repetitively pulsing the sample line 23 at a sufficiently rapid rate to prevent the capacitor from losing an appreciable amount of its charge. Any convenient source of pulses independent of the sample pulses will serve this end.

Another mode of operation of the system of FIG. 2 can be produced as the set and clear lines 21 and 22 are tied in common to a pulse input line 26 which serves as a complementing input. That is to say, if it be assumed once more that capacitor C21 is initially charged and capacitor C22 discharged, a pulse on the line 26 will cause capacitor C22 to become charged through transistor Q26, producing an output at transformer T22. Conduction of transistor Q23 is inhibited due to the biasing action of the charged capacitor C21 and no pulse is generated on the one output line 24. As a consequence of the pulse output of transformer T22, line 25 will be activated and transistor Q21 turned on to discharge capacitor C21. Upon the occurrence of a second pulse on the line 26, transistor Q26 will be prevented from conducting owing to the charge on capacitor C22, but capacitor C21, which was discharged, will now become charged through transistor Q23, producing an output at transformer T21. This activates the line 24, causing transistor Q22 to conduct and capacitor C22 to be discharged. In this way, successive pulses on the line 26 will cause output pulses to be produced alternately on the lines 24 and 25. If desired, line 26 can be pulsed at a relatively rapid rate, for example ten megacycles.

It will be appreciated that the systems described in detail herein are merely illustrative of the basic principle of the invention and that various modifications of the systems embodying this principle will occur to those skilled in the art. Therefore, the invention should not be deemed to be limited to the details of what has been described herein by way of example, but should be deemed to be limited only by the scope of the appended claims.

What is claimed is:

1. A storage device for binary code pulses comprising a first transistor having a first input circuit and a first output circuit, a capacitor and a load impedance disposed in a series combination with said first output circuit, a source of voltage connected across said series combination, a second transistor having a second output circuit coupled across said capacitor and a second input circuit, means to apply clear pulses to said second input circuit to cause said second output circuit to conduct and said capacitor to become discharged when in an initial charged state, means to apply code pulses and sample pulses to said first input circuit, said code and sample pulses acting to change the state of said capacitor from discharged to charged by producing a current flow energizing said load impedance, and means coupled between said load impedance and said second input circuit to cause said second output circuit to conduct in response to said current flow thereby to return said capacitor to a discharged state.

2. A storage device for binary code pulses comprising a first transistor having a first input circuit and a first output circuit, a capacitor and a load impedance disposed in a series combination with said first output circuit, a source of voltage connected across said series combination, a second transistor having a second output circuit coupled across said capacitor and a second input circuit, means to apply clear pulses to said second input circuit to cause said second output circuit to conduct and said capacitor to become discharged when in an initial charged state, means to apply code pulses and sample pulses to said first input circuit, said code and sample pulses acting to change the state of said capacitor from discharged to charged by producing a current flow energizing said load impedance, and a third transistor having a third input circuit and a third output circuit, said third input circuit being adapted to respond to pulses for restoring the state of charge of said capacitor and said third output circuit being coupled between said capacitor and said voltage source to charge said capacitor and to produce a control pulse for application to said second input circuit for control of the impedance of the capacitor discharge path through said second output circuit whenever said capacitor was in a discharged state prior to application of said restore pulse to said third input circuit.

3. An information storage device for storing information coded in binary form comprising a storage capacitor, a first transistor having an input and an output circuit, the output circuit of said first transistor being connected in parallel with said storage capacitor, a second transistor having an input circuit and an output circuit, the output circuit of said second transistor being connected in series with said capacitor, an output transformer connected in series with the output circuit of said second transistor such that a pulse applied to the input circuit of said second transistor turns on said second transistor when said capacitor is discharged enabling current flow in the output circuit of said second transistor to generate an output pulse at said output transformer and to charge said capacitor, the conduction of said second transistor producing a change in the information stored in said device, and a third transistor having an input and an output circuit, the output circuit of said third transistor being connected in series with said capacitor and means connected to the output circuit of said third transistor arranged to apply a signal to the input circuit of said first transistor upon conduction of said third transistor, said third transistor being adapted to conduct in response to a pulse applied to its input circuit when said capacitor is substantially fully discharged such that current flows in its output circuit and charges said capacitor, said means being responsive to this current flow and arranged to apply a signal to the input circuit of said first transistor to discharge said capacitor thus restoring the initial state of charge of the capacitor so that the device reflects the binary value stored therein with integrity.

4. An information storage device for storing information coded in binary form comprising a storage capacitor, a first transistor having an input and an output circuit, the output circuit of said first transistor being connected in parallel with said storage capacitor, a second transistor having an input circuit and an output circuit, the output circuit of said second transistor being connected in series with said capacitor, an output transformer connected in series with the output circuit of said second transistor such that a pulse applied to the input circuit of said second transistor turns on said second transistor when said capacitor is discharged enabling current flow in the output circuit of said second transistor to generate an output signal at said output transformer and to charge said capacitor, the conduction of said second transistor producing a change in the information stored in said device, and an output control circuit responsive to said signal from said output transformer including means responsive to said signal to selectively restore the state of charge on said capacitor to the value prior to the application of the pulse to the input circuit of said second transistor and means responsive to said signal to selectively apply a signal to associated output circuitry.

5. The information storage device as claimed in claim 4 wherein the output control circuit includes a third transistor having an input circuit and an output circuit, means to apply the output signal from said output transformer to the input circuit of said third transistor and wherein said charge restoring means and said signal applying means respectively include fourth and fifth transistors each having an input and output circuit, the output circuits of said fourth and fifth transistors each being connected in series with the output of said third transistor, the output circuit of said fourth transistor being coupled to said associated output circuitry and the output circuit of said fifth transistor being coupled to the input circuit of said first transistor, means to apply a transfer out pulse to the input circuit of said fourth transistor to produce conduction in its output circuit and apply a signal to the associated output circuitry in response to said third transistor's output, and means to apply a restore pulse to the input circuit of said fifth transistor to produce conduction in its output circuit and couple a pulse back to said first transistor to discharge said capacitor in response to said third transistor's output.

6. An information storage device for storing information coded in binary form comprising a storage capacitor, a first transistor having an input circuit and an output circuit, the output circuit of said first transistor being connected in parallel with said storage capacitor, a second transistor having an input circuit and an output circuit, the output circuit of said second transistor being connected in series with said capacitor, an output impedance connected in series with the output circuit of said second transistor such that a signal applied to the input circuit of said second transistor turns on said second transistor when said capacitor is in a first state of charge enabling current flow in the output circuit of said second transistor to generate an output signal at said output impedance and to place said capacitor in a second state of charge, the operation of said second transistor producing a change in the information stored in said device, and a third transistor having an input circuit and an output circuit, the output circuit of said third element being connected in series with said capacitor, and coupling means connected to the output circuit of said third transistor arranged to apply a signal to the input circuit of said first transistor when said third transistor is operated, said third transistor being adapted to operate in response to a pulse applied to its input circuit when said capacitor is substantially in said first state of charge to apply a signal through said coupling means to the input circuit of said first transistor to restore said capacitor to said first state of charge, and when said capacitor is substantially in said second state of charge to place said capacitor fully in said second state of charge without applying a signal through said coupling means.

References Cited in the file of this patent

UNITED STATES PATENTS

| | | |
|---|---|---|
| 2,804,570 | Thomas et al. | Aug. 27, 1957 |
| 2,840,799 | Holt | June 24, 1958 |
| 2,925,585 | Bruce | Feb. 16, 1960 |

OTHER REFERENCES

Digital Computer Components and Circuits, by R. Richards, November 1957, pages 297–299.